United States Patent Office 2,927,123
Patented Mar. 1, 1960

2,927,123
THIOPHOSPHORIC ACID ESTERS AND PROCESS FOR THEIR PRODUCTION

August Dörken, Wuppertal-Sonnborn, and Gerhard Schrader, Wuppertal-Cronenberg, Germany, assignors to Farbenfabriken Bayer Aktiengesellschaft, Leverkusen, Germany, a corporation of Germany No Drawing. Application May 28, 1958
Serial No. 738,317

Claims priority, application Germany June 7, 1957

12 Claims. (Cl. 260—461)

The present invention relates to and has as its objects new and useful insecticidal thiophosphoric acid esters of the following general formula

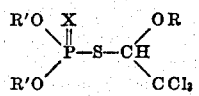

wherein R' stands for alkyl radicals, R stands for alkyl as well as for any desired substituted alkyl radical, and X denotes oxygen or sulfur.

The object of copending application Serial No. 672,109, filed July 16, 1957, is the production of thiophosphoric acid esters characterized by reacting compounds of the formula

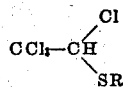

with salts of O.O-dialkylthio- or -dithiophosphoric acids, and the new esters thus obtained.

In the addition of alcohols on chloral semi-acetals are formed

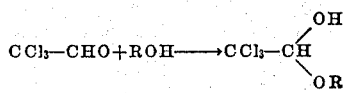

The OH group in these semi-acetals may be exchanged for halogen, especially for chlorine with the aid of e.g. phosphorous pentachloride. In the resultant α-chlorotetraethyl ethers of the general formula

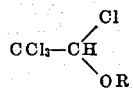

wherein R stands for any desired aliphatic radical (which may furthermore be substituted) the chlorine in the α-position may also readily be exchanged for any desired radicals of dialkylthiol- or dialkylthionothiol phosphoric acids, whereby the new compounds of the above shown formula are obtained.

It is advantageous to start from the ammonium or alkali metal salts of the aforesaid phosphoric acids and to effect the reaction in suitable solvents at temperatures of about 50–120° C. The following solvents have proved to be especially suitable: alcohols, ketones such as methyl ethyl ketone, methyl isopropyl ketones, or hydrocarbons such as toluene.

The new thiol- or thionothiol-phosphoric acid esters thus obtained are distinguished by their good insecticidal action.

The new compounds of the present invention very effectively kill insects like flies, mites, aphids, etc. They distinguish themselves especially by a good contact-insecticidal activity and at the same time by an activity on eating insects such as caterpillars. Most surprisingly they are of remarkable low toxicity against mammals.

They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with a commercial emulsifier), alcohols, especially lower alcohols such as methanol or ethanol, ketones, especially lower ketones such as acetone or methyl ethyl ketone, liquid hydrocarbons and the like. The new compounds may furthermore be used in combination with each other or with brown insecticides, fertilizers etc.

The insecticidal activity of the inventive compounds may be seen from the following test results.

Aqueous dilutions of the following compounds

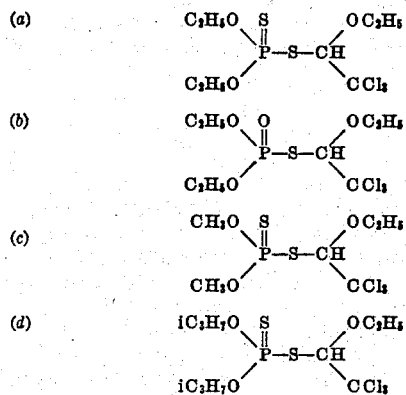

have been prepared by mixing the active ingredient with the same amount of dimethyl formamide as an auxiliary solvent adding thereafter 20% by weight referred to active ingredient of a commercial emulsifier consisting of a benzyl hydroxy polyglycol ether containing about 10 to 15 glycol residues, and diluting at last this premixture with water to the desired concentration indicated in the following paragraphs. The tests have been carried out in the following manner:

Against spider mites (contact-insecticidal action) with compound (a). Bean plants (*Phaseolus vulgaris*) of about 15 inches' hight are sprayed drip wet with solutions prepared as indicated above. The bean plants have been infested heavily with the two-spotted spider (species *Tetranychus telarius*). Evaluation has been carried out after 24 hours, 48 hours and 8 days. Spider mites were killed completely with solutions of 0.01%;

Against caterpillars with compound (b). White cabbage has been sprayed drip wet with aqueous emulsions as prepared above in the concentration as indicated below. Caterpillars (of the type diamond back moth, 10 each) have been placed on the sprayed leaves of the white cabbage. The living status has been determined after 24 hours and 48 hours. The caterpillars were completely killed with solutions of 0.1%;

Against flies of the type *Musca domestica* with compounds (c) and (d). About 50 flies were placed under covered Petri dishes in which drip wet filter paper has been placed which is sprayed with an insecticidal solution as prepared above. The living status of the flies has been determined after 24 hours. Flies were killed completely with solutions of 0.001%.

The following examples are given by way of illustration only without, however, limiting the present invention thereto:

*Example 1*

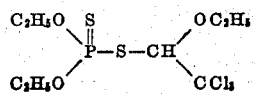

41 grams of the ammonium salt of diethyl-thionothiol-phosphoric acid are dissolved in 75 millilitres of methyl ethyl ketone. 50 grams of tetrachlorethyl ether (B.P. 46–47° C/2 mm. Hg) are added dropwise with good stirring. The solution is heated to 80° C. with stirring for a further hour, then cooled to room temperature, filtered off with suction from the ammonium chloride thus formed and the solvent is then removed by distillation in vacuo. The residue thus obtained is taken up in 200 millilitres of benzene and shaken with 50 millilitres of a 4 percent sodium bicarbonate solution. After drying the benzene solution over sodium sulphate, the solvent is distilled off in vacuo. The residue is then distilled under a high vacuum at a pressure of 0.01 mm. Hg. 36 grams of the new ester are thus obtained which goes over at 83–86° C. as a colourless, water-insoluble oil. Yield 50 percent of the theoretical.

Toxicity on rats orally $DL_{50}$ 100 mg./kg.

Aphides and spider mites are completely killed with solutions containing 0.01 percent of the new ester.

Example 2

$$\begin{array}{c} C_2H_5O \\ \phantom{C_2H_5O} \diagdown \phantom{O} \\ \phantom{C_2H_5O} P-S-CH \\ \phantom{C_2H_5O} \diagup \phantom{O} \\ C_2H_5O \end{array} \begin{array}{c} O \\ \| \\ \end{array} \begin{array}{c} OC_2H_5 \\ \diagup \\ \\ \diagdown \\ CCl_3 \end{array}$$

38 grams of the ammonium salt of diethyl-thiol-phosphoric acid are suspended in 90 grams of tetrachloroethyl ether and heated to 115° C. with stirring for 30 minutes. Upon cooling, the reaction mixture is treated with 100 millilitres of acetone and filtered off with suction from the ammonium chloride thus formed. The residue remaining after distilling off the acetone is taken up in 200 millilitres of benzene, washed twice with 30 millilitres of water each time and subsequently dried over sodium sulphate. After evaporation of the solvent, the residue is purified by fractionation under a high vacuum. 42 grams of the new ester are obtained as a light-yellow, water-insoluble oil of B.P. 86–88° C./0.01 mm. Hg. Yield 61 percent of the theoretical.

Mean toxicity on rats orally 50 mg./kg.

Caterpillars are completely killed with concentrations of 0.1 percent.

Example 3

$$\begin{array}{c} CH_3O \\ \phantom{CH_3O} \diagdown \\ \phantom{CH_3O} P-S-CH \\ \phantom{CH_3O} \diagup \\ CH_3O \end{array} \begin{array}{c} S \\ \| \\ \end{array} \begin{array}{c} OC_2H_5 \\ \diagup \\ \\ \diagdown \\ CCl_3 \end{array}$$

45 grams of the sodium salt of dimethyl-thiono-thiol-phosphoric acid are dissolved in 70 millilitres of water. 53 grams of tetrachlorethyl ether are added with stirring to this solution and the mixture is heated to 95–100° C. for 2 hours. The solution is then cooled to room temperature and the oily product is taken up in 200 millilitres of benzene. After working up in the usual manner, 28 grams of the new ester are obtained as a light-yellow oil going over at 79° C. under a pressure of 0.01 mm. Hg. Yield 34 percent of the theoretical.

Toxicity on rats per os $DL_{50}$ 500 mg./kg.

Aphides and grain beetles are completely killed with solutions containing 0.01 percent of the new ester. Flies are also completely killed with 0.001 percent aqueous solutions.

Example 4

$$\begin{array}{c} iC_3H_7O \\ \phantom{iC_3H_7O} \diagdown \\ \phantom{iC_3H_7O} P-S-CH \\ \phantom{iC_3H_7O} \diagup \\ iC_3H_7O \end{array} \begin{array}{c} O \\ \| \\ \end{array} \begin{array}{c} OC_2H_5 \\ \diagup \\ \\ \diagdown \\ CCl_3 \end{array}$$

44 grams of the ammonium salt of diisopropyl-thiol-phosphoric acid are suspended in 100 grams of tetrachlorethyl ether and heated to 120° C. with stirring for 40 minutes. The mixture is cooled to room temperature and treated with 120 millilitres of acetone and then filtered off from the separated ammonium chloride. 200 millilitres of benzene are added to the filtrate and the mixture is then washed three times with 50 millilitres of water each time. After working up in conventional manner, 67 grams of the new ester are obtained going over at 87° C./0.01 mm. Hg as a colourless oil. Yield 90 percent of the theoretical.

Mean toxicity on rats orally 1000 mg./kg.

0.001 percent solutions kill flies completely.

Example 5

$$\begin{array}{c} C_2H_5O \\ \phantom{C_2H_5O} \diagdown \\ \phantom{C_2H_5O} P-S-CH \\ \phantom{C_2H_5O} \diagup \\ C_2H_5O \end{array} \begin{array}{c} O \\ \| \\ \end{array} \begin{array}{c} OCH_3 \\ \diagup \\ \\ \diagdown \\ CCl_3 \end{array}$$

42 grams of the ammonium salt of diethyl-thiol-phosphoric acid are suspended in 80 grams of 1,2,2,2'-tetrachloretyl methyl ether (B.P. 65° C./14 mm. Hg). The suspension is heated to 115° C. with stirring for 30 minutes. It is then cooled to room temperature and 100 millilitres of acetone are added. The precipitated ammonium chloride is filtered off. The filtrate is then treated with 200 millilitres of benzene and washed three times with 50 millilitres of water each time. After usual working up, 43 grams of the new ester are obtained which goes over under a pressure of 0.01 mm. Hg at 72° C. as a colourless, water-insoluble oil. Yield 59 percent of the theoretical.

Orally on rats the toxicity is 50–100 mg./kg.

Aphides are killed to 100% with solutions containing 0.01 percent of the ester. Spider mites and caterpillars are likewise killed to 100% with 0.1 percent solutions.

Example 6

$$\begin{array}{c} C_2H_5O \\ \phantom{C_2H_5O} \diagdown \\ \phantom{C_2H_5O} P-S-CH \\ \phantom{C_2H_5O} \diagup \\ C_2H_5O \end{array} \begin{array}{c} S \\ \| \\ \end{array} \begin{array}{c} OCH_3 \\ \diagup \\ \\ \diagdown \\ CCl_3 \end{array}$$

41 grams of the ammonium salt of diethyl-thiono-thiol-phosphoric acid are suspended in 100 grams of tetrachlorethyl-methyl ether and then heated to 110° C. with stirring for 30 minutes. The suspension is cooled to room temperature. After working up in conventional manner 44 grams of the new ester are obtained which goes over under a pressure of 0.01 mm. Hg at 80° C. as a light-yellow, water-insoluble oil. Yield 62 percent of the theoretical.

On rats orally the new ester has a mean toxicity of 100–150 mg./kg.

0.001 percent solutions kill flies to 100%. Aphides are likewise completely killed with 0.01 percent solutions.

By the same way but using instead of 100 grams tetrachloro-ethylmethyl ether the exactly equimolecular amount of tetra-chloro-ethyl isopropyl ether there is obtained the ester of the following formula $$\begin{array}{c} C_2H_5O \\ \phantom{C_2H_5O} \diagdown \\ \phantom{C_2H_5O} P-S-CH \\ \phantom{C_2H_5O} \diagup \\ C_2H_5O \end{array} \begin{array}{c} S \\ \| \\ \end{array} \begin{array}{c} OC_3H_7i \\ \diagup \\ \\ \diagdown \\ CCl_3 \end{array}$$

Example 7

$$\begin{array}{c} C_2H_5O \\ \phantom{C_2H_5O} \diagdown \\ \phantom{C_2H_5O} P-S-CH \\ \phantom{C_2H_5O} \diagup \\ C_2H_5O \end{array} \begin{array}{c} O \\ \| \\ \end{array} \begin{array}{c} O-CH_2-CH_2-SC_2H_5 \\ \diagup \\ \\ \diagdown \\ CCl_3 \end{array}$$

29 grams of the ammonium salt of diethyl-thiol-phosphoric acid are dissolved in 40 millilitres of n-propyl alcohol. 41 grams of tetrachlorethyl-β-ethylmercaptoethyl ether are added dropwise with stirring (B.P. 71° C./0.01 mm. Hg; the chloride is prepared by condensation of 1 mol of chloral with 1 mol of β-ethylmercapto ethanol and subsequent chlorination of the semi-acetal with phosphorus pentachloride). The solution is subsequently heated with further stirring to 105° C. for one hour. After working up in conventional manner, 38.5 grams of the new ester are obtained as a reddish brown, water-insoluble oil. The ester is not distillable without decomposition even under a pressure of 0.01 mm. Hg. Yield 63 percent of the theoretical.

Toxicity on rats orally $DL_{50}$ 150 mg./kg.

0.01% solutions skill aphides and spider mites completely. Moreover the compound possesses a marked ovicidal action on the eggs of the red spider.

Working exactly as described above but using instead of 41 grams of tetra-chloro ethyl-β-ethylmercapto ethyl ether the equimolecular amount of the corresponding tetra-chloro-ethyl-β-ethoxy-ethyl ether, -β-cyano ethyl ether or -β-chloro-ethyl ether (the intermediates of which have been prepared in an analogous manner as described in the present example) there are obtained the compounds of the following formulae:

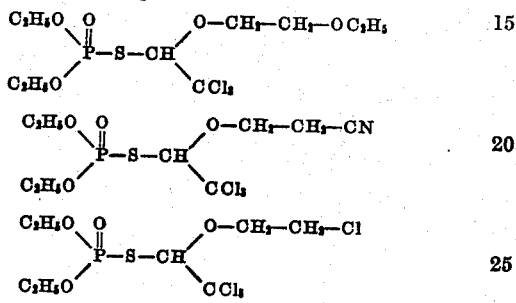

We claim:
1. Thiophosphoric acid esters of the formula

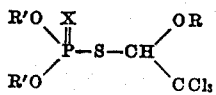

wherein R' stands for lower alkyl radicals up to 4 carbon atoms, R stands for a member selected from the group consisting of lower alkyl radicals up to 4 carbon atoms, their lower alkyl-mercapto-substitution products, their lower alkoxy-substitution products, their cyano-substitution products, and their mono-halo-substitution products, and X stands for a member selected from the group consisting of oxygen and sulfur.

2. The thiophosphoric acid ester of the following formula

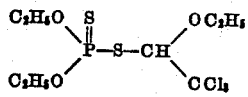

3. The thiophosphoric acid ester of the following formula

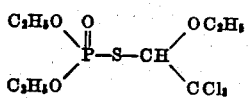

4. The thiophosphoric acid ester of the following formula

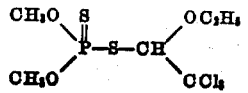

5. The thiophosphoric acid ester of the following formula

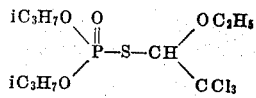

6. The thiophosphoric acid ester of the following formula

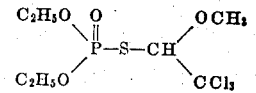

7. The thiophosphoric acid ester of the following formula

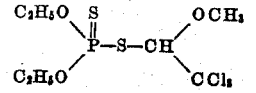

8. The thiophosphoric acid ester of the following formula

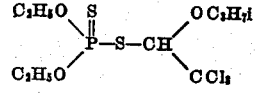

9. The thiophosphoric acid ester of the following formula

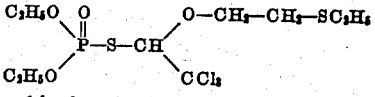

10. The thiophosphoric acid ester of the following formula

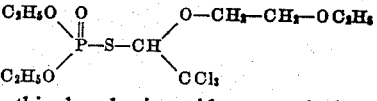

11. The thiophosphoric acid ester of the following formula

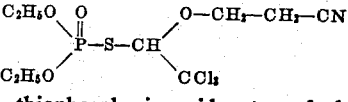

12. The thiophosphoric acid ester of the following formula

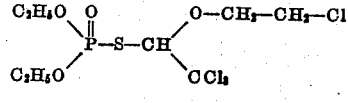

References Cited in the file of this patent
UNITED STATES PATENTS

| | | |
|---|---|---|
| 2,565,920 | Hook et al. | Aug. 28, 1951 |
| 2,565,921 | Hook et al. | Aug. 28, 1951 |
| 2,596,076 | Hook et al. | May 6, 1952 |

FOREIGN PATENTS

| 1,022,582 | Germany | Jan. 16, 1958 |
|---|---|---|

OTHER REFERENCES

Perkow et al.: "Naturwissenschaften," vol. 39, p. 353 (1952).